United States Patent [19]
Lay et al.

[11] Patent Number: 6,098,158
[45] Date of Patent: Aug. 1, 2000

[54] SOFTWARE-ENABLED FAST BOOT

[75] Inventors: Tatchi Placido Lay; Brien Henry Muschett; Allen Justin Ramlow; Cuong Huu Tran, all of Austin, Tex.

[73] Assignee: International Business Machines Corporation, Armonk, N.Y.

[21] Appl. No.: 08/993,518

[22] Filed: Dec. 18, 1997

[51] Int. Cl.[7] .................................................. G06F 12/02
[52] U.S. Cl. ........................ 711/162; 711/161; 711/171; 713/2
[58] Field of Search .................................... 711/161, 162, 711/171; 713/2

[56] References Cited

U.S. PATENT DOCUMENTS

| | | |
|---|---|---|
| 5,193,175 | 3/1993 | Cutts, Jr. et al. . |
| 5,317,752 | 5/1994 | Jewett et al. . |
| 5,452,454 | 9/1995 | Basu . |
| 5,497,494 | 3/1996 | Combs et al. . |
| 5,511,202 | 4/1996 | Combs et al. . |
| 5,513,359 | 4/1996 | Clark et al. . |
| 5,519,869 | 5/1996 | Payne et al. . |
| 5,577,220 | 11/1996 | Combs et al. . |
| 5,596,747 | 1/1997 | Katabami et al. . |

OTHER PUBLICATIONS

"IBM Technical Disclosure Bulletin," vol. 37, No. 02B, Feb. 19, 1994, 185–186.
Chen, P.M., et al, "The Rio file cache: surviving operating system crashes," IN SIGPLAN Not. (USA), 7th Intl. Conference on Architetural Support for Programming Languages and Operating Systems, Oct. 1996, IEE.

*Primary Examiner*—Jack A. Lane
*Attorney, Agent, or Firm*—Jeffrey S. LaBaw; David H. Judson

[57] ABSTRACT

A method of generating a boot image and using the boot image to restore a computer system having a processor, an operating system, physical memory, virtual memory and disk storage. The method may be initiated from any particular software application, or at multiple execution points within a particular application. One or more boot images may be stored in association with an initiating application. By providing full virtual memory support in the boot image, the computer system may be restored to any predetermined operating state.

32 Claims, 3 Drawing Sheets

SOFTWARE-ENABLED FAST BOOT

BACKGROUND OF THE INVENTION

1. Technical Field

The present invention relates generally to computer systems software backup and, more particularly, to a application-directed method of saving a boot image in a dynamical manner to facilitate a "fast boot" to any predetermined system operating environment.

2. Description of the Related Art

The conventional approach to booting an operating system involves the predefined ordering, loading and initialization of system components, which includes the operating system kernel and its associated subsystems. Because each component must be initialized, boot time is often considerable.

More specifically, the conventional boot sequence involves a repetitive process of loading and initializing system modules. Each module must be read from the system's disk drive and then loaded into memory. After the module is loaded into memory, that module's initialization code must be executed to initialize local variables, memory and associated devices. In many operating systems, this sequence must be done sequentially and in a predefined order for the system to initialize properly.

For example, in computer systems running the IBM® OS/2® operating system, the system boot loader is first loaded. In turn, it loads the OS/2 Kernel, which takes control and begins to load the required system dynamic load libraries ("DLLs"). After the system DLLs are loaded, the graphical user interface ("GUI") is initialized. Finally, other user level applications may be started. This entire sequence involves loading modules from disk, initializing memory, swapping and scheduling different processes, and then setting up the system environment so that the user may begin to load its applications.

For many computer system users, however, the conventional boot sequence described above is far too long. In such circumstances, so-called "fast boot" system restoration is often mandated as a system operating constraint due to the "mission critical" nature of the environment in which the system is being used. A typical example might be a medical system running in a hospital emergency room. If that system were to crash due to a power failure, a patient's welfare might well be at stake if the computer system cannot recover in as short a time as possible. Indeed, if the system had to be rebooted using the normal boot sequence, such a process could take up to 5 minutes, which is obviously unacceptable.

There have attempts in the prior art to address this problem. One known approach to "soft booting" an operating system (such as DOS) is to save a compressed image of the operating system in an extended memory area of the computer's physical memory (e.g., RAM) and then boot the computer from that static image. Although this approach decreases boot time, the image is lost once the system is powered down. Moreover, the technique requires that the operating system use a dedicated area in RAM for the boot image.

It is also known to create and store a bootstrap image in non-volatile storage, such as a direct access storage device. In response to a power failure or other system malfunction, the bootstrap image is read from the storage device and executed as a result of execution of the system Initial Program Loadable (IPL) control program. The basic approach is described in U.S. Pat. Nos. 5,519,869, and that patent also teaches a technique for controlling the density with which the image is originally written to the storage device. Another conceptually similar approach is the Rapid Resume™ feature presently implemented in certain personal computer systems made and sold by IBM®. This feature is a hardware and BIOS solution, which allows the state of the computer system to be saved when the user turns off the computer via a power switch. At that time, the operating system and then-executing application programs are saved in a boot image at a fixed location in disk storage. The approach, however, requires that hardware devices in the computer have advanced power management ("APM") capability. Moreover, if the user adds additional memory, the storage disk must be reconfigured, which is undesirable.

Although such disk storage-based "boot image" methods provide certain advantages, there remains a need in the art to provide further enhancements to the known "fast boot" process and to otherwise extend application of the process into other operating system environments.

BRIEF SUMMARY OF THE INVENTION

The present invention is an application-driven "fast boot" process for a computer system, wherein the computer system preferably runs a virtual memory-capable operating system. According to the invention, the fast boot process may be executed dynamically at any given time from any given software application program including, without limitation, mission critical software, to create a "snapshot" or image of a hardware, software and system operating environment. Multiple images are preferably taken at different times, and particular images may be saved or replaced as needed. In addition to saving the contents of physical memory, the boot image includes the contents of the system's virtual memory such that the image is useful to facilitate a fast boot to any predetermined system environment. Further, storage of the boot image is not restricted to any particular location in disk storage. Rather, the boot image is dynamically relocatable as necessary for memory management.

The invention is preferably implemented in a computer system having a processor, a virtual memory (VM)-capable operating system, physical memory (e.g., RAM), a dedicated virtual memory, and hard disk or other non-volatile storage. According to the present invention, a method of generating a boot image for use in restoring the computer system begins at a given point during execution of a software application. The particular software application may be a mission critical application, or any other selected application. In response, the application generates a request to create a boot image. After the routine determines the size of physical and virtual memory then in use, an area of disk storage is then allocated at some then-available position or offset within that storage. The area need not be contiguous. The area is of sufficient size to support contents of at least the physical memory and the virtual memory at the given execution point in the software routine from which the routine is called. The allocated disk storage area is also preferably large enough to include system state information. To complete the storage routine, the contents of the physical memory and virtual memory are then transferred to the allocated storage area.

Periodically, the boot image may be replaced or supplemented with another boot image. Thus, the inventive method envisions that multiple snapshots of the execution environment may be taken and stored in sequence or by substituting one image for another, or both. In a multiple processor or "cluster" environment, multiple machine boot images may be saved. Upon a given occurrence, such as a power outage or other system failure or interruption, the computer system is then restored to a given execution state from the boot image.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
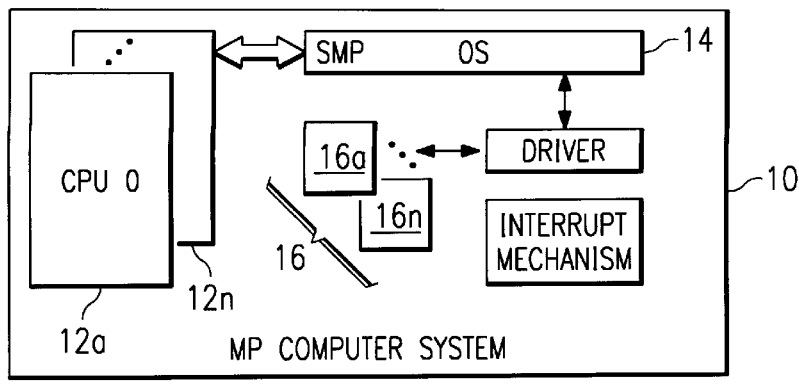
FIG. 1 is a representative computer system in which the present invention is implemented.

FIG. 1 illustrates a representative computer system 10 having multiple processors 12a . . . 12n. The various processors 12 of the system 10 may be Intel x86-based microprocessors that are controlled by a multiprocessing operating system (OS) 14, such as the OS/2® SMP (symmetric multiprocessing) operating system available from IBM. The computer system has a number of associated external devices 16a . . . 16n such as keyboards, disk storage and diskette drivers and printers. Each external device 16 is controlled by software run by the operating system.

Figure 2:
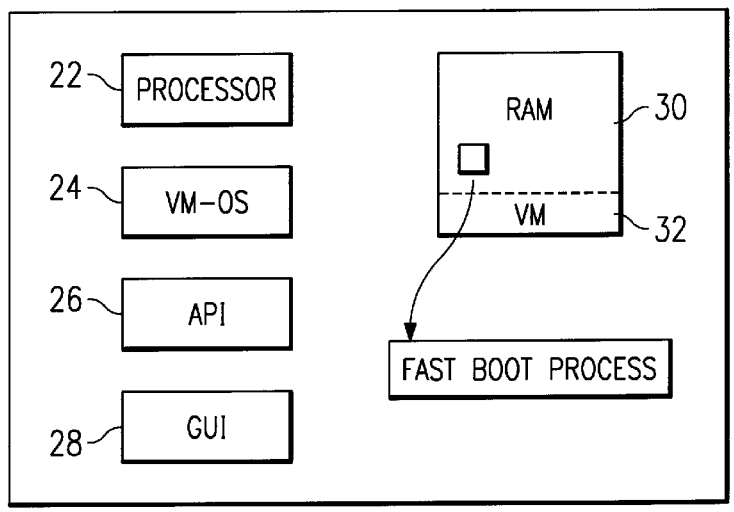
FIG. 2 is a block diagram of a representative computer whose operating system environment is restored using the fast boot process of the invention.

As seen in FIG. 2, a particular computer in which the invention is preferably implemented includes a processor 22, an virtual memory (VM)-capable operating system 24, an operating system application programming interface (API) 26, a graphical user interface 28, and RAM (or equivalent physical) storage 30. A portion 32 of the physical storage is allocated to virtual memory (VM) management, which is a well-known technique for swapping data between physical memory and hard disk storage where necessary to facilitate full use of available processing cycles. The portion 32 is sometimes referred to herein as "swap" memory or a "swap file." The particular size and characteristics of the swap file changes dynamically as a particular software application executes as a function of how other system resources are being allocated.

In the preferred embodiment, the invention is implemented in a virtual memory-based operating system environment. Thus, for example, the computer used in the present invention is any personal computer or workstation client or server platform that is Intel®-, PowerPC®- or RISC-based, and that includes an operating system such as IBM® OS/2®, Microsoft Windows NT 4.0, Microsoft Windows 95, Unix, AIX®, OS/400 or the like. For a mission critical enterprise environment, a representative cluster computer configuration runs Intel x86 processors and the OS/2 SMP operating system, as previously described. Although the remainder of the description relates to a multiprocessor system running Intel x86 processors) and the OS/2 SMP operating system, the inventive techniques may be implemented in other uniprocessor or multiprocessor systems running on non Intel-based processors (e.g., RISC-based) and/or other MP-based operating systems (e.g., MVS, AIX, Windows NT, Novell Netware and others). Moreover, the inventive process may be implemented in whole or in part in or across a distributed computing environment.

Figure 3:
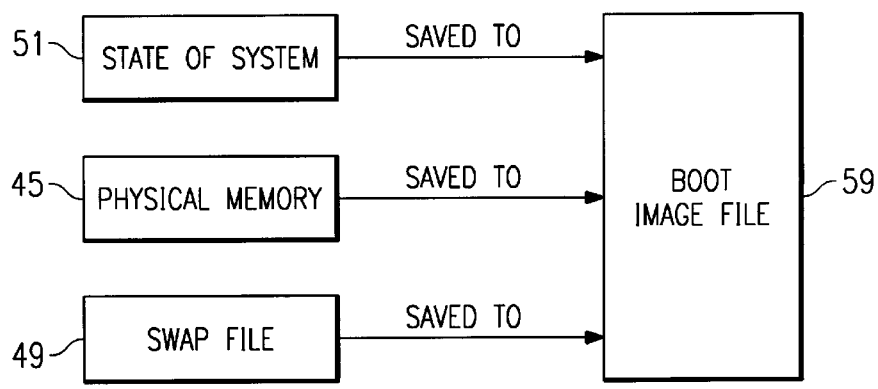
FIG. 3 is block diagram illustrating how the disk storage is dynamically allocated according to the invention for saving a boot image.

According to the present invention, a boot image is saved in disk storage and used to restore system upon a given occurrence including, without limitation, a power failure or interruption, system operation failure or other unintentional or intentional acts or omissions. FIG. 3 is a block diagram of the boot image generated by the inventive process, and FIG. 4 is a flowchart describing a preferred technique for created the boot image.

According to the invention, the fast boot process may be initiated by any particular software application (an "initiating" application) at any arbitrary point during the execution of that application. One or more boot images may be saved in association with a particular initiating application. This feature of the invention is particularly advantageous as it allows an application to continuously create boot image(s) at various times during its execution. Thus, in some circumstances (depending on the particular type of fault or occurrence), it may be easier or faster for the system to be restored from one particular image over another stored or previously stored image.

Figure 4:
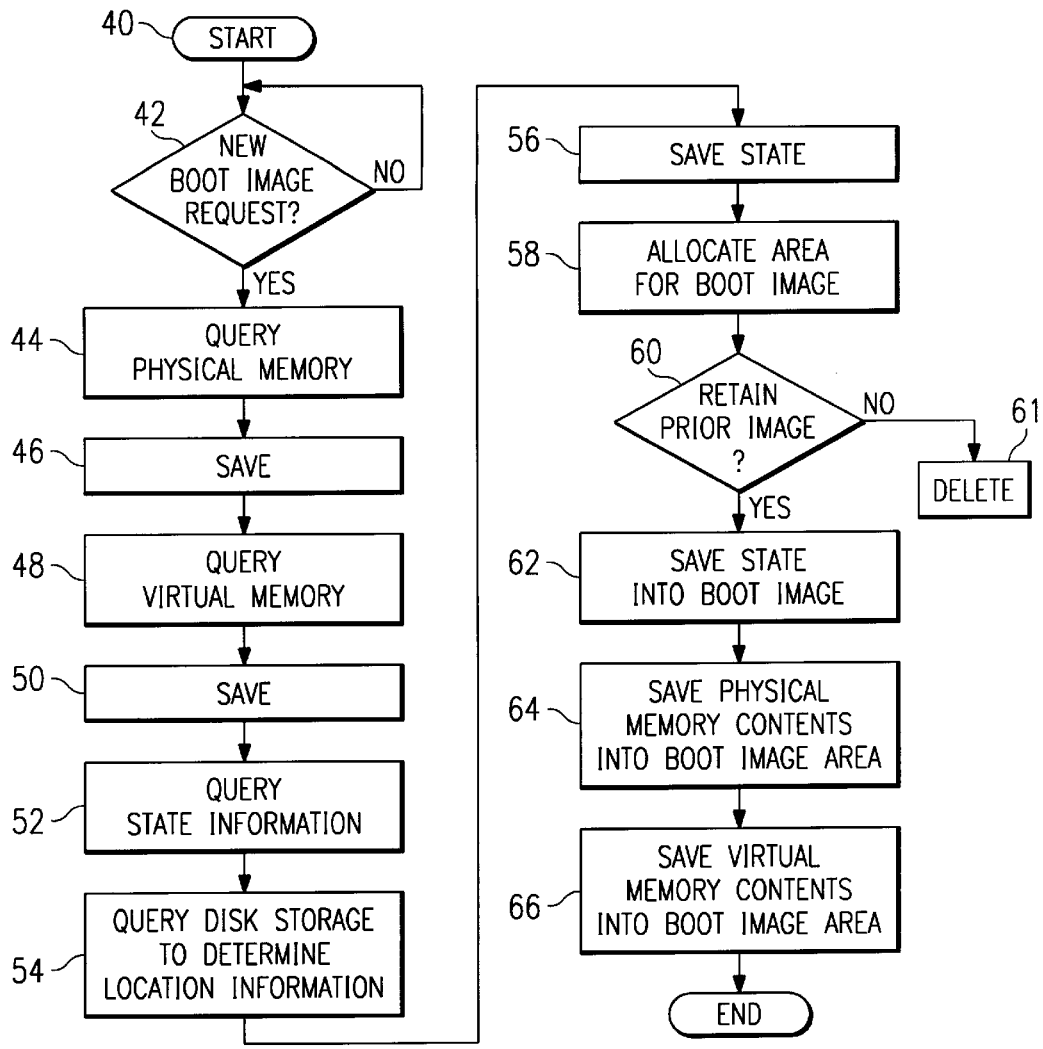
FIG. 4 is a flowchart illustrating preferred method steps for saving one or more boot image(s) in association with a given initiating application.

Referring now to FIGS. 3 and 4 together, the fast boot routine begins at step 40. Preferably, this routine is implemented in software at the operating system level. At step 42, a test is made to determine whether a request to create a boot image has been received. In an illustrative example, a new boot image creation request is invoked by a call to the operating system API 26 (shown in FIG. 2). The call is initiated a selected point of execution within a calling application which, as noted above, may be any software application. One or more such "calls" may be strategically placed within the application so that one or more boot images are continuously created. Any suitable technique for initiating the boot image "save" routine may be used as well. Moreover, as noted above, multiple such images may then be stored and used for system restoration, as will be seen.

If the outcome of the test at step 42 is negative, the routine cycles and waits for the API invocation. If, on the other hand, the outcome of the test at step 42 indicates that a request to create a new boot image has been made, the routine continues at step 44 to issue a query to determine the size of physical memory 45 (illustrated in FIG. 4) currently in use. The physical memory size is then saved at step 46. At step 48, the routine issues a query to determine the size of the virtual memory or "swap file" 49 (see FIG. 4) currently in use. This value is then saved at step 50. At step 52, the routine determines the size of whatever system state or other control information 51 (see FIG. 4) that may also be needed to later restore the system from the boot image. The system state information comprises (or will comprise) the applicable CPU register set, other processor-specific control block information, as well as the control information that will identify where the boot image is to be located on the disk storage. At step 54, the routine queries the disk storage subsystem to determine an available location for the boot image. One or more queries and responses may be required to resolve this question depending on the size of the physical and virtual memory regions required. The system state size information is then saved at step 56.

The routine then continues at step 58 to allocate a sufficient area 59 (see FIG. 4) in disk storage for the boot image. At step 60, a test is made to determine whether a previously saved boot image should be retained. If the outcome of the test is negative, the previously saved boot image is deleted from storage (which may be at a different storage location or at an overlapping location) at step 61. If the outcome of the test at step 60 is positive, the routine continues to save the new boot image. In particular, at step 62, the system state information is saved into the allocated area (namely, the boot image file). The routine then continues at step 64 to place the physical memory contents into the boot image file. Step 64 thus appends the physical memory contents to the end of the system state information. At step 66, the contents of the virtual memory are placed into the boot image file. Step 66 thus appends the virtual memory contents to the end of the physical memory contents. This particular ordering of the physical and virtual memory portions of the boot image is preferred, but it is not required. This completes the boot image creation routine.

Figure 5:
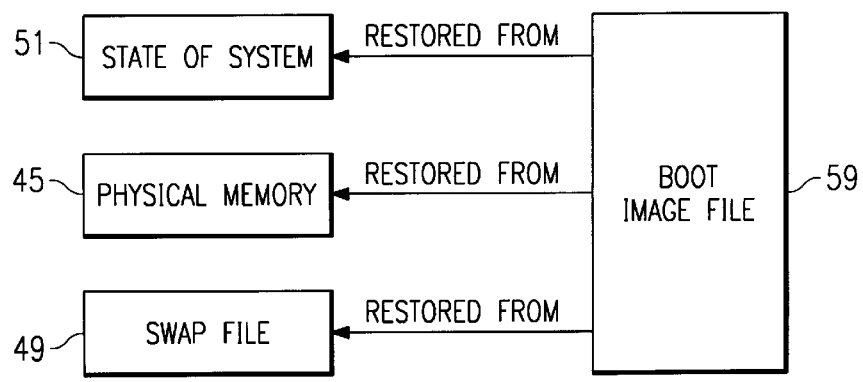
FIG. 5 is a block diagram illustrating how the system operation is restored from a selected boot image.
Figure 6:
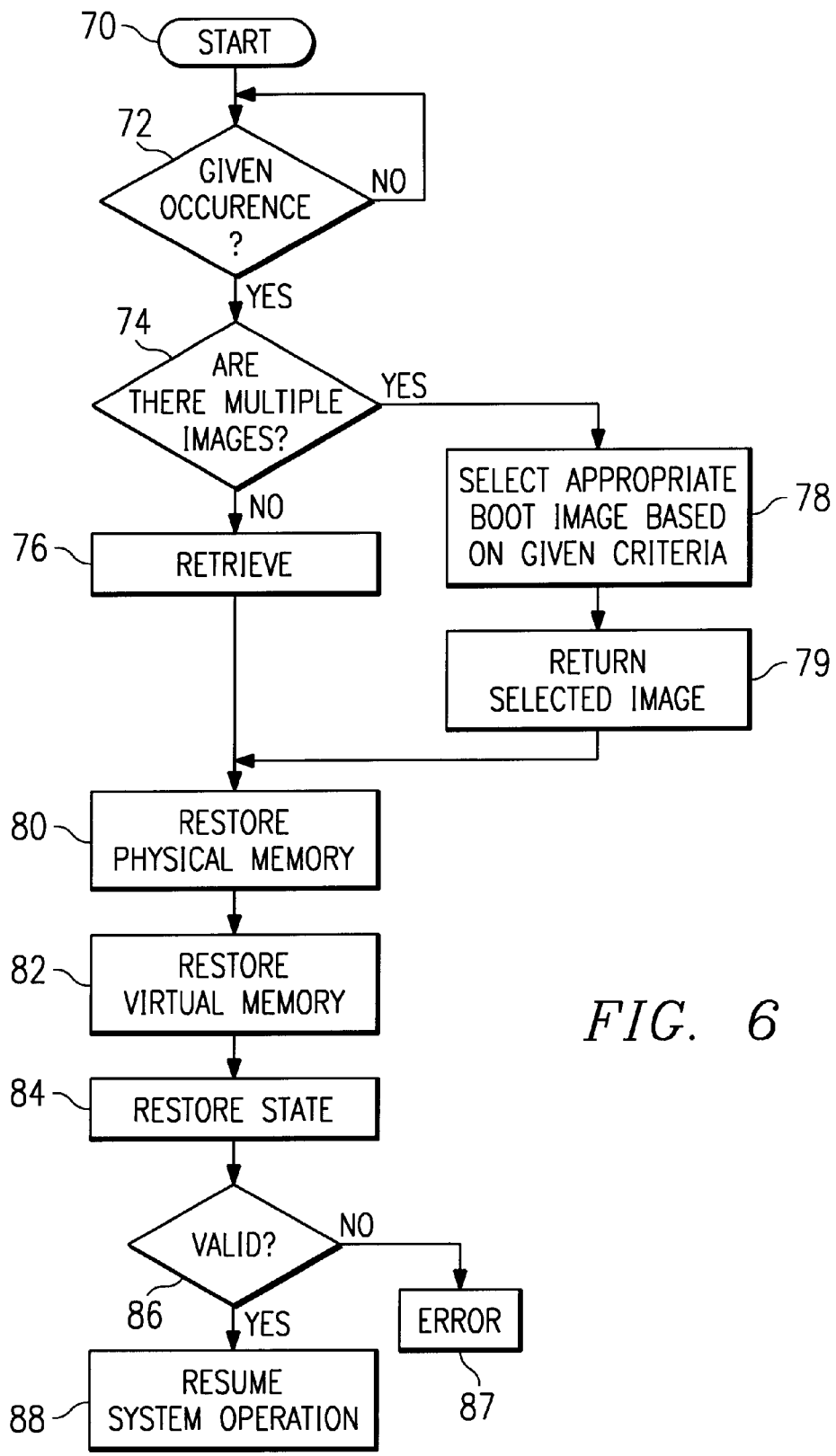
FIG. 6 is a flowchart described the preferred method steps for restoring the system operation from a selected boot image.

Referring now to FIGS. 5–6, it is now assumed that some system outage or interference dictates initiation of the fast boot restoration process. The routine begins at step 70. At step 72, a test is done repeatedly to determine whether the given occurrence has taken place. As noted above, the given occurrence may be a power outage, a system failure, a user request, or any other given act or omission. If the outcome of the test at step 72 is negative, the routine cycles. If, however, the outcome of the test at step 72 is positive, the routine continues at step 74. A test is done at this point to determine whether multiple boot images are present in the system with respect to the particular application being executed. If the outcome of the test at step 74 indicates that only one boot image exists for the application, the routine continues at step 76 to retrieve that boot image. If, however, the outcome of the test at step 74 indicates that multiple boot images have been stored, the routine continues at step 78 to select the appropriate boot image based on some given criteria (e.g., boot image creation date, information about the particular occurrence that necessitated the restart, and the like). The selected image is then returned at step 79.

At step 80, the physical memory contents of the boot image are restored to physical memory. At step 82, the swap file contents of the boot image are restored to virtual memory. At step 84, the states of the system are restored from the boot image file. Steps 80, 82 and 84 may occur in any sequence. At step 86, a validation routine is executed to determine whether the portions of the boot image satisfy some given criteria (e.g., a checksum or the like). If not, an error is returned at step 87. If, however, the outcome of the test at step 86 is positive, the system operation is resumed at step 88. This completes the processing.

The present invention provides many advantages. First, the inventive routine enables a fast boot to any predetermined system environment. Moreover, because the technique is application-driven and does not require any hardware modifications, it can be easily implemented in any existing computer system.

By providing virtual memory support, any VM-capable operating system may be fast booted using the inventive technique. Moreover, boot image may be created "on the fly" by any particular software application by having the application use an OS API to make a call to the inventive routine. Thus, the inventive technique may be triggered from any application, such as a mission critical application. Thus, the fast boot process is not restricted (as in the prior art) to implementation by a system administrator or the user during a specific management process.

Further, the particular boot image created need not be static in the sense that multiple such images may be "taken" at particular times during the operation of a given software program (or across multiple programs or program executions) so that a "current" boot image may be present at all times depending on the then-current particular execution environment. This feature provides added flexibility for the overall process.

Finally, since the particular boot image may be created at any time, the invention facilitates use of any available portion of the disk storage and not merely some dedicated portion that must then be reconfigured to "free up" space for the boot image.

One of the preferred implementations of the fast boot process of the present invention is as a set of instructions (program code) in a code module resident in the random access memory of the computer, preferably the client computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As noted above, the invention may be used or practiced in any type of computer system and not just in a virtual memory (VM) capable operating system. Thus, as described above, the software-enable fast boot process may be implemented in a uniprocessor or multiprocessor (i.e. cluster) environment.

Having thus described our invention, what we claim as new and desire to secure by letters patent is set forth in the following claims:

1. A method of generating a boot image for use in restoring a computer system having a processor, an operating system, physical memory, virtual memory and disk storage, comprising the steps of:

at a given point during execution of an application, having the application generate a request to create a boot image;

responsive to the request, allocating an area of disk storage sufficient to support contents of at least the physical memory and the virtual memory at the given execution point; and transferring contents of the physical memory and virtual memory to the area to create the boot image.

2. The method as described in claim 1 wherein the given point is arbitrary.

3. The method as described in claim 1 further including the step of determining a size of the physical memory contents and a size of the virtual memory contents prior to the allocating step.

4. The method as described in claim 1 wherein the area of the disk storage allocated is also sufficient to support system state information.

5. The method as described in claim 4 further including the step of storing the system state information in the area as part of the boot image.

6. The method as described in claim 1 wherein the area of disk storage is dynamically located.

7. A method of generating a boot image and using the boot image to restore a computer system having a processor, an operating system, physical memory, virtual memory and disk storage, comprising the steps of:
    at a given point during execution of an application, having the application generate a request to create a boot image;
    responsive to the request, allocating an area of disk storage sufficient to support contents of the physical memory and the virtual memory;
    transferring contents of the physical memory and virtual memory to the area; and
    upon a given occurrence, restoring the computer system from the boot image.

8. The method as described in claim 7 wherein the restoring step comprises:
    restoring the physical memory contents to the physical memory; and
    restoring the virtual memory contents to the virtual memory.

9. The method as described in claim 8 further including the step of restoring system state information.

10. The method as described in claim 9 further including the step of resuming system operation.

11. A method of generating boot images for use in restoring a computer system having a processor, an operating system, physical memory, virtual memory and disk storage, comprising the steps of:
    at a first given point during execution of an application, having the application issue a first API call to the operating system to request creation of a first boot image;
    responsive to the first API call, allocating an area of disk storage sufficient to support contents of at least the physical memory and the virtual memory at the given execution point; and
    transferring contents of the physical memory and virtual memory to the area to create the first boot image.

12. The method as described in claim 11 further including the steps of:
    at a second given point during execution of the application, having the application issue a second API call to the operating system to request creation of a second boot image; and
    responsive to the second API call, determining whether the first boot image is to be overwritten or retained.

13. The method as described in claim 12 wherein if the first boot image is to be overwritten, the method performs the following steps:
    deleting the first boot image;
    allocating an area of disk storage sufficient to support contents of at least the physical memory and the virtual memory at the given execution point associated with the second API call; and
    transferring contents of the physical memory and virtual memory to the area to create the second boot image.

14. The method as described in claim 12 wherein if the first boot image is to be retained, the following steps are performed:
    allocating a second area of disk storage sufficient to support contents of at least the physical memory and the virtual memory at the given execution point associated with the second API call; and
    transferring contents of the physical memory and virtual memory to the second area to create the second boot image.

15. A method of generating boot images for use in restoring a computer system having a processor, an operating system, physical memory and disk storage, comprising the steps of:
    for each of a set of initiating applications:
        at a given point during execution of an initiating application, having the application generate a request to create at least a first boot image;
        responsive to the request, allocating an area of disk storage sufficient to support contents of at least the physical memory at the given execution point; and
        transferring contents of the physical memory to the area to create the boot image for the initiating application.

16. A computer program product in a computer-readable medium for generating a boot image for use in restoring a computer system having a processor, an operating system, physical memory, virtual memory and disk storage, comprising:
    means operative at a given point during execution of an application for generating a request to create a boot image;
    means responsive to the request for allocating an area of disk storage sufficient to support contents of at least the physical memory and the virtual memory at the given execution point; and
    means for transferring contents of the physical memory and virtual memory to the area to create the boot image.

17. The computer program product as described in claim 16 wherein the allocating means includes means for determining a size of the contents of the physical memory and the contents of the virtual memory.

18. The computer program product as described in claim 16 further including means responsive to a given occurrence for recalling the boot image from disk storage to restore system operation.

19. The computer program product as described in claim 18 wherein the recalling means includes means for selectively identifying a particular boot image of a set of stored boot images to be used to restore system operation.

20. A computer system, comprising:
    at least one processor,
    a virtual memory (VM) compliant operating system;
    physical memory;
    virtual memory;
    disk storage,
    at least one initiating application; and
    a fast boot routine called by the initiating application, comprising:
        means operative at a given point during execution of the initiating application for generating a request to create a boot image;
        means responsive to the request for allocating an area of the disk storage sufficient to support contents of at least the physical memory and the virtual memory at the given execution point; and means for transferring contents of the physical memory and virtual memory to the area to create the boot image.

21. The computer system as described in claim 20 wherein the allocating means of the fast boot routine includes means for determining a size of the contents of the physical memory and the contents of the virtual memory.

22. The computer system as described in claim 20 wherein the fast boot routine further including means responsive to a given occurrence for recalling the boot image from disk storage to restore system operation.

23. The computer system as described in claim 22 wherein the recalling means of the fast boot routine includes means for selectively identifying a particular boot image of a set of stored boot images to be used to restore system operation.

24. The computer system as described in claim 20 further including at least two or more processors.

25. The computer system as described in claim 24 wherein the processors are tightly coupled in a cluster configuration.

26. A method of restoring a computer system from a boot image, the computer system comprising a processor, an operating system, physical memory, virtual memory and disk storage, comprising the steps of:

upon a given occurrence:

restoring the physical memory contents from the boot image to the physical memory;

restoring the virtual memory contents from the boot image;

restoring system state information from the boot image; and resuming system operation.

27. The method as described in claim 26 wherein the boot image is stored in an area of the disk storage.

28. The method as described in claim 27 wherein the area is non-contiguous.

29. A computer program product in a computer-readable medium for use in restoring a computer system having a processor, an operating system, physical memory, virtual memory and disk storage, comprising:

means responsive to given requests from an initiating application for generating and saving boot images; and means responsive to a given occurrence for selecting a given one of the boot images for use in restoring the computer system.

30. The method as described in claim 29 wherein each boot image is saved in an allocated area of disk storage.

31. The method as described in claim 30 wherein the allocated area is non-contiguous.

32. The method as described in claim 29 wherein at least one given request is an API call from the initiating application.

* * * * *